(12) United States Patent
Schneider et al.

(10) Patent No.: US 9,331,995 B2
(45) Date of Patent: *May 3, 2016

(54) SECURE CONFIGURATION OF MOBILE APPLICATION

(71) Applicants: Juergen Schneider, Ludwigshafen (DE); Paul El Khoury, Heidelberg (DE); Sami Lechner, Heidelberg (DE)

(72) Inventors: Juergen Schneider, Ludwigshafen (DE); Paul El Khoury, Heidelberg (DE); Sami Lechner, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,903

(22) Filed: Apr. 22, 2014

(65) Prior Publication Data

US 2014/0230031 A1    Aug. 14, 2014

Related U.S. Application Data

(63) Continuation-in-part of application No. 13/453,221, filed on Apr. 23, 2012.

(30) Foreign Application Priority Data

Apr. 23, 2013   (EP) ..................................... 13164801

(51) Int. Cl.
| | |
|---|---|
| *G06F 7/04* | (2006.01) |
| *H04L 29/06* | (2006.01) |
| *H04W 4/00* | (2009.01) |
| *H04W 12/06* | (2009.01) |
| *G06F 21/43* | (2013.01) |
| *G06F 21/57* | (2013.01) |
| *H04N 7/16* | (2011.01) |

(Continued)

(52) U.S. Cl.
CPC ................ *H04L 63/08* (2013.01); *G06F 21/43* (2013.01); *G06F 21/57* (2013.01); *H04W 4/003* (2013.01); *H04W 12/06* (2013.01); *G06F 8/61* (2013.01); *G06F 2221/2103* (2013.01); *H04W 12/02* (2013.01)

(58) Field of Classification Search
CPC ..... G06F 21/305; G06F 21/335; G06F 21/35; G06F 21/572; G06F 21/6209; G06F 2221/2103; G06F 2221/2119; G06F 8/61; H04L 63/08
USPC .......................................................... 726/6
See application file for complete search history.

(56) References Cited

U.S. PATENT DOCUMENTS

| | | | |
|---|---|---|---|
| 6,922,723 B1 * | 7/2005 | Sharp et al. | ................... 709/221 |
| 7,308,718 B1 | 12/2007 | Brookner | |
| 7,877,461 B1 | 1/2011 | Rimmer | |

(Continued)

OTHER PUBLICATIONS

European Search Report dated Jan. 8, 2014, from a corresponding application, EP 13164801.

(Continued)

*Primary Examiner* — Linglan Edwards
*Assistant Examiner* — Gary Gracia
(74) *Attorney, Agent, or Firm* — Fountainhead Law Group PC

(57) ABSTRACT

Secure configuration of a mobile application ("app") includes sending the required configuration data for the app to the user's mobile computing device in a communication, for example an email with an attachment. A verification value is included in the attachment to protect the authenticity and integrity of the configuration data. A challenge code is issued to the user (or group of users). The challenge code is used to verify the configuration data.

18 Claims, 10 Drawing Sheets

(51) Int. Cl.
  *G06F 9/445* (2006.01)
  *H04W 12/02* (2009.01)

(56) References Cited

U.S. PATENT DOCUMENTS

| | | | |
|---|---|---|---|
| 8,126,963 B1* | 2/2012 | Rimmer | 709/203 |
| 8,706,588 B1* | 4/2014 | Zhu | 705/35 |
| 2002/0091938 A1* | 7/2002 | Hiltunen et al. | 713/200 |
| 2006/0080659 A1* | 4/2006 | Ganji | 717/178 |
| 2007/0271459 A1 | 11/2007 | Gomez | |
| 2008/0144796 A1* | 6/2008 | Ringland et al. | 379/210.01 |
| 2008/0215883 A1* | 9/2008 | Fok | H04L 63/0869 713/167 |
| 2009/0075630 A1* | 3/2009 | McLean | G06F 21/602 455/411 |
| 2009/0119773 A1* | 5/2009 | D'Amore et al. | 726/21 |
| 2009/0287921 A1 | 11/2009 | Zhu et al. | |
| 2009/0325565 A1 | 12/2009 | Backholm | |
| 2010/0241836 A1 | 9/2010 | Proudler | |
| 2010/0313019 A1 | 12/2010 | Joubert | |
| 2011/0016320 A1 | 1/2011 | Bergsten et al. | |
| 2011/0047620 A1 | 2/2011 | Mahaffey et al. | |
| 2011/0067097 A1 | 3/2011 | Park et al. | |
| 2011/0154456 A1 | 6/2011 | Machani | |
| 2012/0017081 A1 | 1/2012 | Courtney et al. | |
| 2012/0046110 A1* | 2/2012 | Amaitis | G07F 17/3237 463/42 |
| 2012/0077482 A1 | 3/2012 | Backholm | |
| 2012/0144203 A1 | 6/2012 | Albisu | |
| 2012/0222129 A1* | 8/2012 | Racciopi et al. | 726/27 |
| 2012/0246484 A1 | 9/2012 | Blaisdell et al. | |
| 2012/0254853 A1 | 10/2012 | Aggarwal et al. | |
| 2012/0254857 A1* | 10/2012 | Doraiswamy et al. | 717/177 |
| 2012/0254949 A1 | 10/2012 | Mikkonen et al. | |
| 2012/0260232 A1 | 10/2012 | Hirsch et al. | |
| 2013/0024947 A1 | 1/2013 | Holland et al. | |
| 2013/0074168 A1* | 3/2013 | Hao et al. | 726/7 |
| 2013/0110721 A1 | 5/2013 | Bogaard | |
| 2013/0166899 A1* | 6/2013 | Courtney | G06F 21/53 713/100 |
| 2013/0210418 A1* | 8/2013 | Cannon et al. | 455/420 |
| 2013/0283377 A1 | 10/2013 | Das et al. | |
| 2013/0283397 A1 | 10/2013 | Griffin | |
| 2014/0208100 A1 | 7/2014 | Kendall | |

OTHER PUBLICATIONS

European Search Report (from a corresponding foreign application), 14154959.2, Mailed May 21, 2014.

* cited by examiner

Screen #1

Screen #2

SECURE CONFIGURATION OF MOBILE APPLICATION

BACKGROUND

Unless otherwise indicated herein, the approaches described in this section are not prior art to the claims in this application and are not admitted to be prior art by inclusion in this section.

Mobile applications ("apps") running on mobile computing devices such as smart phones and tablet devices are typically downloaded by users from public application stores ("app store") available on the Internet. The proliferation of mobile computing devices and their level of computing capabilities have made such devices viable alternatives as remote clients to backend systems. For example, an organization may have several business application systems that support the organizations. Mobile computing devices allow user of the organization (e.g., sales people) to access these backend systems remotely.

Client-side applications for mobile devices can be distributed through an appstore channel just like any other mobile app. Business apps, however, typically require an amount of configuration which app generally do not require. For example, after download and installation on the mobile computing device, a business app may need to be configured with information about the organization's servers ("backend servers"), resource address, and port (typically in the form of a Uniform Resource Locator, URL) and any other additional app-specific configuration information, such as user interface settings, security policy information, and so on. For non-technical users, such configuration details can be difficult to enter manually into the app, time-consuming, error-prone, and thus pose an impediment to broad and fast adoption of any mobile apps the organization may want to push out.

In addition, the integrity and authenticity of such configuration information is crucial for the secure operation of an app and to protect against misuse of personal data, identity, and confidential data processed by the app. For example, if the configuration information is somehow attacked or hacked, the user may inadvertently configure an app to connect to a malicious server without the user's knowledge. When the user enters their login information (e.g., username and password), the hacker will be given information allowing them to break into the real servers in the organization.

DETAILED DESCRIPTION

Figure 1:
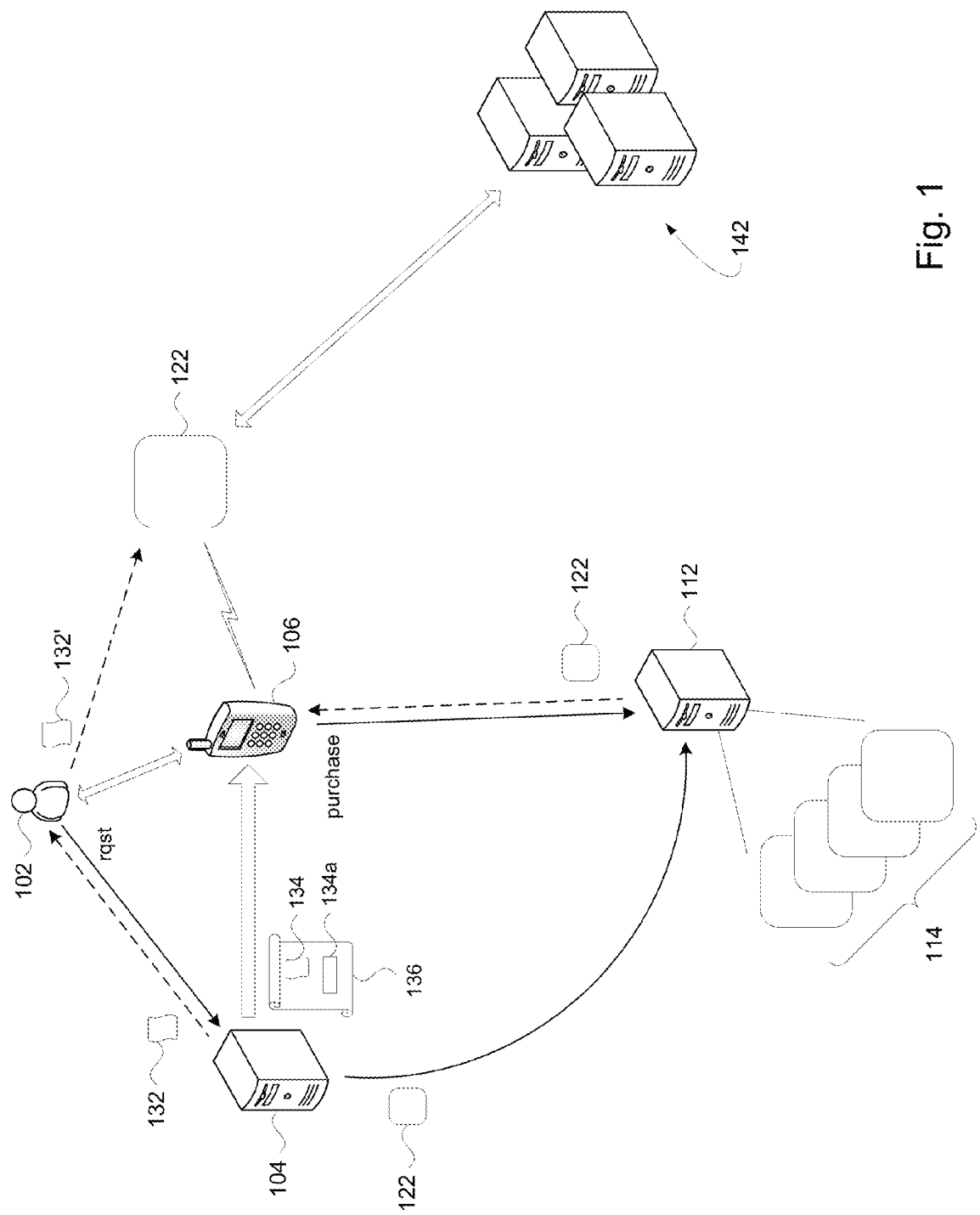
FIG. 1 illustrates an arrangement of components in accordance with the present disclosure.

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein. Like or identical elements of the embodiments described below are designated by identical reference numerals throughout the description.

FIG. 1 shows a typical arrangement for configuring an app in accordance with embodiments of the present disclosure. User 102 represents a user in the organization. The user 102 may have a mobile computing device 106 (e.g., smart phone, computer tablet, and so on) that they use for conducting business on behalf of the organization; e.g., a sales person, a procurement specialist in manufacturing, etc.

The organization may provide and support an application server 104 to provide apps (e.g., app 122) that execute on the user's mobile computing device 106. The application server 104 may upload the app 122 to an app store server 112 (e.g., Apple® Appstore) which hosts a library 114 of apps for downloading to mobile computing devices such as mobile computing device 106. The organization may provide apps to facilitate planning and scheduling vacations, to review customer records or sales orders, to access customer accounting information, to access production data, and so on. The apps developed for the organization are typically intended to facilitate access to the organization's data stored in the organization's backend servers 142.

The user 102 may interact with the app store server 112 to purchase the app 122. In some embodiments, the app 122 may be a free download. For example, in the case of an organization wanting to distribute the app to its employees, the app 122 is likely to be free, and so "purchasing" simply means the user 102 downloading the free app from the app store server 112 to their mobile computing device 106.

The user 102 may interact with the application server 104 to inform the application server that they want to configure an app 122 that they currently have or are planning to install on their mobile computing device 106. For example, configuring the app 122 may involve providing configuration data to the app so that the app can communicate with one or more servers 142 of the organization. In some embodiments, the user 102 makes a request to the application server 104, and in response the application server may provide the user with a challenge code 132. In addition, the application server 104 may send configuration data 134 and a verification value 134a to the user 102 via a communication 136.

When the user 102 retrieves the communication 136 using their mobile computing device 106, the mobile computing device may launch the app 122. As will be explained in more detail below, the user 102 may provide a challenge code 132' to the app 122, which may then verify the configuration data 134. If the configuration data 134 is deemed to be verified, then the app 122 may use the configuration data to conduct communications with the organization's server(s) 142.

Figure 1A:
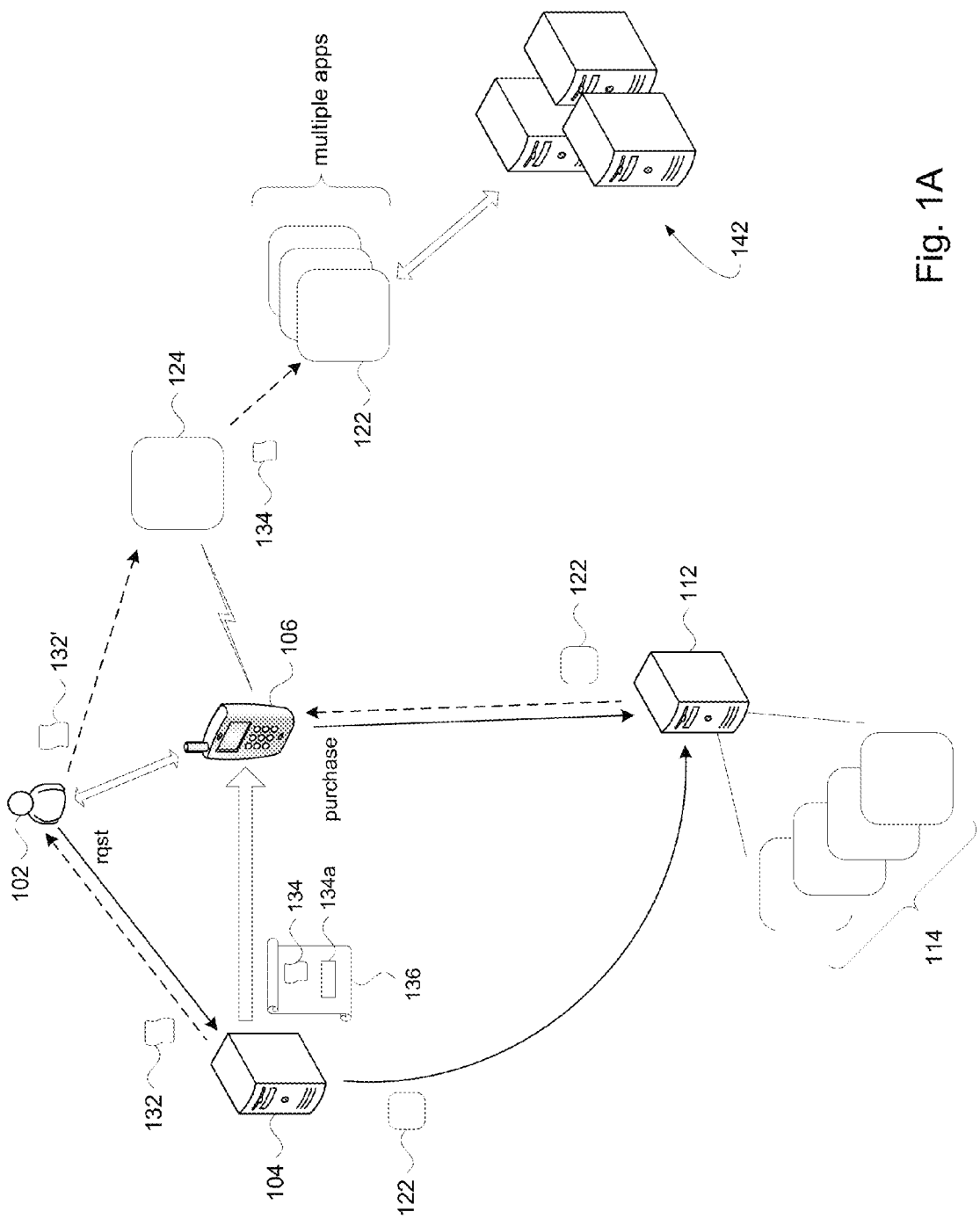
FIG. 1A illustrates an alternative arrangement of components in accordance with the present disclosure.

Referring to FIG. 1A, in some embodiments, a configuration app 124 may be installed on the user's mobile computing device 106. When the user 102 retrieves the communication 136 with their mobile computing device 106, the configuration app 124 may be launched to verify the configuration data 134. If the configuration data 134 is deemed to be verified (e.g., using the user-provided challenge code 132'), then the configuration app 124 may provide the configuration data 134 to the app 122, which may then conduct communications with the organization's server(s) 142. In some embodiments, the configuration data 134 may provide information that allows the configuration app 124 to configure multiple apps.

Figure 2:
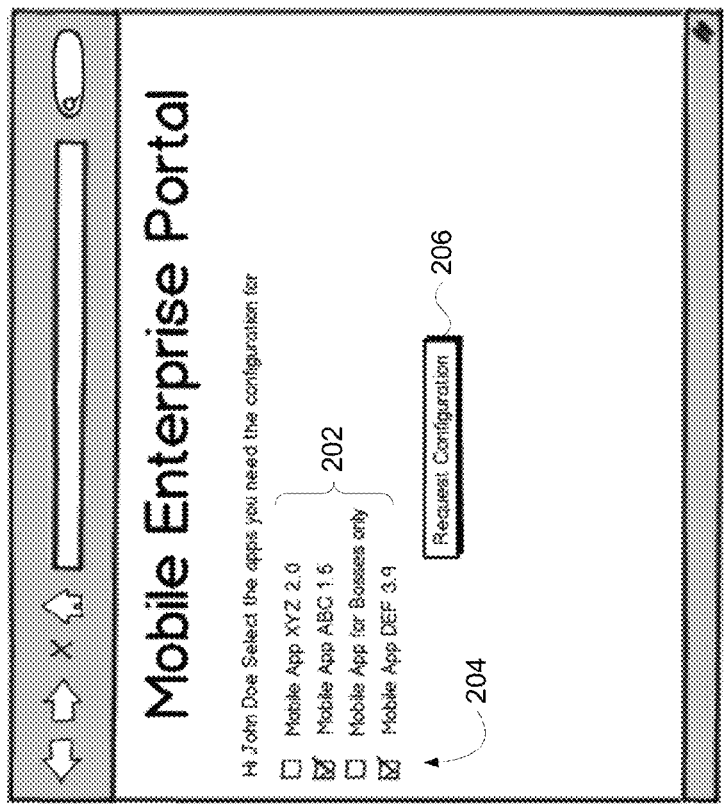
FIG. 2 shows a portal interface that an application server may present to a user.
Figure 2:
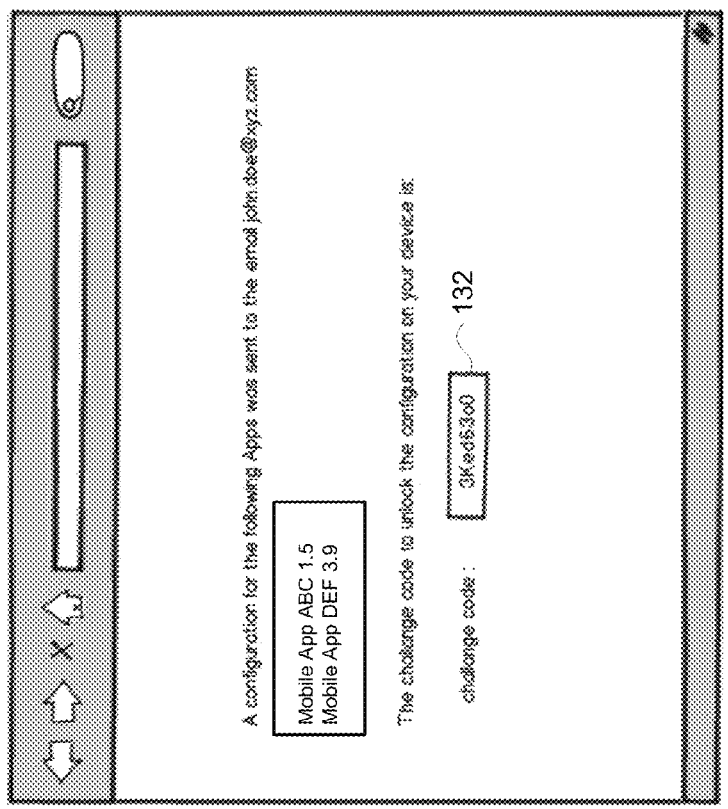

FIG. 2 shows illustrative examples of a portal interface that the application server 104 may present to the user 102. The application server 104 may be accessed in any of several ways. For example, the application server 104 may be accessed over a local communication network such as a local area network. As another example, the user 102 may access the application server 104 from the Internet using a web browser; e.g., using HTTPS if security is desired.

In Screen #1 of FIG. 2, the portal interface may present to the user 102 a list 202 of apps that the application server 104 supports. For example, the list 202 may include apps that can be downloaded from the app store server 112. The user 102 may select one or several apps that they want to configure on their mobile computing device 106. For example, a set of check boxes 204 can allow the user 102 to select the apps of interest. The user 102 may then indicate they have completed the selection process, for example, by clicking the "Request Configuration" button 206.

In Screen #2, the portal interface may confirm the selection made by the user 102. In accordance with the present disclosure, the portal interface may display a challenge code 132 to the user 102. The user 102 may then write down the challenge code 132 (e.g., on a piece of paper), the user may store the challenge code on their mobile computing device 106 (e.g., using a notepad program or by copying the challenge code into a cut & paste buffer of the mobile computing device 106), and so on.

Figure 3:
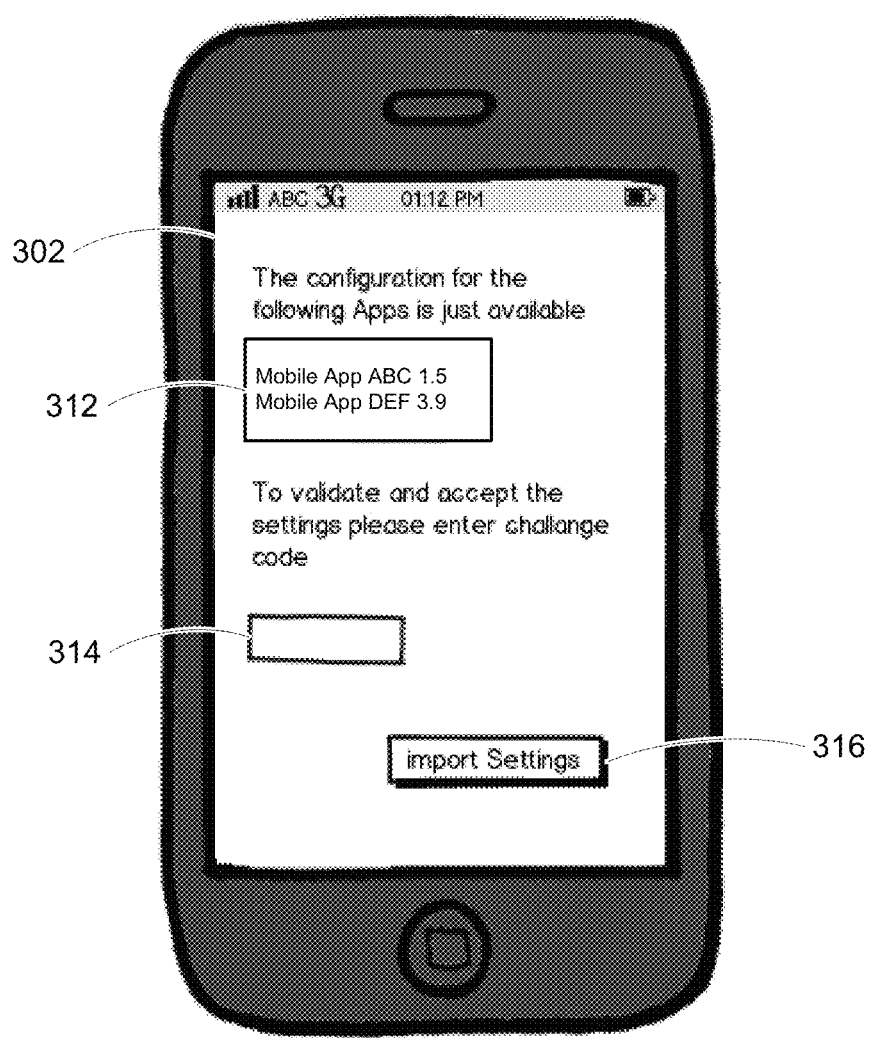
FIG. 3 shows a display that a mobile computing device may present to a user.

FIG. 3 shows an illustrative example of a display 302 that may be presented to the user 102 on their mobile computing device 106, when the user retrieves the communication 136 sent by the application server 104. The display 302 shown in FIG. 3 is an example of a display that the configuration app 124 (FIG. 1A) may display when it is launched. In some embodiments, the user's selection of apps made in FIG. 2 may produce configuration data 134 suitable for configuring the selected apps. In addition, the display 302 may show to the user 102 a list 312 of the user's selected apps that will be configured by the configuration data 134. The display 302 may include an input box 314 for receiving the challenge code 132' from the user 102. A button 316 allows the user 102 to begin the verification process. In some embodiments, the functionality of the configuration app 124 may be included in the app 122 to be configured such that a separate configuration app is not necessary.

Figure 4:
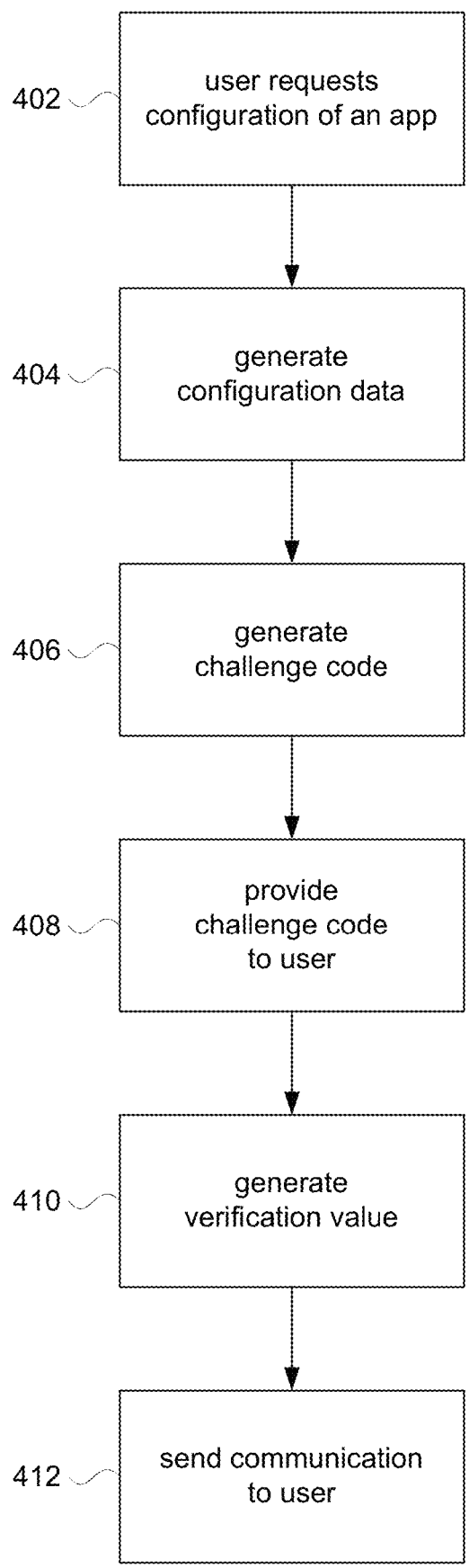
FIG. 4 illustrates an example of processing that may be performed by the application server.

Additional details will now be discussed in the context of processing in accordance with the principles of the present disclosure. Referring to FIG. 4, in a step 402, user 102 may initiate configuration processing for an app on their mobile device 106 using the application server 104. The user 102 may specify one or more apps 122 to be configured; for example, by using an interface such as illustrated in FIG. 2.

In a step 404, the application server 104 may generate configuration data 134 for the one or more apps 122 specified in step 402. The specific information that comprises the configuration data will vary from one app to another. The configuration data 134 may include information that will allow the app 122 to establish a communication link to the servers 142 in the organization, such as server name, IP address, port numbers, and so on. The configuration data 134 may include data security measures such as encryption and decryption keys. The configuration data 134 may configure the app 122 according to who the user 102 is; for example, certain features may be enabled or disabled for a given user. And so on.

In a step 406, the application server 104 may generate a challenge code 132. The challenge code 132 may be a randomly generated number, a random text string, a random string of alphanumeric characters, and in general may include any random string of printable characters. The challenge code 132 may be provided to the user 102 (step 408), for example, by displaying the challenge code on the portal interface shown in FIG. 2. The user 102 may then write down the challenge code 132 to be used later on, or copy the challenge code into the cut and paste buffer of the mobile computing device 106 for temporary storage.

In a step 410, the application server 104 may generate a verification value 134a (FIG. 1) using the challenge code 132 that the application server generated in step 406 and the configuration data 134 generated in step 404. In an embodiment, for example, a hash-based message authentication code (HMAC) may be computed by concatenating the configuration data 134 with the challenge code 132, and feeding the concatenated string into a secure hash function to produce the verification value 134a. Typical secure hash functions include SHA 1 or SHA-256. It will be appreciated of course that the verification value 134a may be produced using any of several known secure hash functions performed on the combination of configuration data 134 and the challenge code 132. Moreover, any deterministic and reproducible combination of the configuration data 134 and the challenge code 132 may be used as input to the secure hash function. The configuration data 134 and the challenge code 132 may be "combined" in any way and order. The configuration data 134 and the challenge code 132 may be concatenated (disclosed above), the configuration data 134 and the challenge code 132 may be encrypted and the resulting ciphers may be combined, and so on. It is noted that the secure hash function used for generating the verification value 134a is a "one-way" function. In other words, applying the same secure hash function to the same combination of configuration data 134 and challenge code 132 will always lead to the same verification value 134a, but the configuration data 134 and the challenge code 132, in particular, cannot be recovered from the verification value 134a.

In a step 412, a communication 136 is sent to the user 102. In accordance with principles of the present disclosure, the communication 136 comprises the configuration data 134 and the verification value 134a. In some embodiments, the communication may be an email message having an attachment. In other embodiments, the communication may be an HTTP redirect response, directly launching the app 122 to be configured or a dedicated configuration app 124 on the mobile device. It will be appreciated that other suitable forms of sending the communication 136 to the user 102 may be used. As will be explained in more detail below, the challenge code 132 provided to the user in step 408 may then be used to verify the configuration data 134, but the challenge code 132 itself is not contained in communication 136.

As indicated in the foregoing discussion, in some embodiments there is a one-to-one association between the challenge code 132 and a user; the one user requests a configuration, receives the challenge code, and as will be explained below uses that challenge code to verify configuration data for app 122 on their mobile computing device. In some situations however, it may be more efficient to allow a single challenge code 132 to be used for multiple users. For example, suppose an initial roll-out of an app is targeted for deployment to a large group of users in an organization. A single user (e.g., a department manager) may log onto the application server 104, initiate a request for configuration of the app to be rolled out, and receive a single challenge code 132 (step 408). The application server 104 may then generate the verification value 134*a*, and the communication 136 comprising the configuration data 134 and the verification value 134*a*. The application server 104 may be provided with a list of users who are to receive the communication 136 (step 412). The department manager may then distribute the challenge code 132 to the group of users. Each user may then download the app and using the common challenge code 132 verify the configuration data 134 for that app. In this way, only one single challenge code and one verification value need to be generated by the application server 104, rather that generating as many challenge codes and verification values as there are users in the large group of users.

In accordance with various embodiments of the present disclosure, the communication channel over which the application server 104 provides the challenge code 132 to the user 102 may be separate from the communication channel over which the communication 136 is delivered to the user, or the two communications may take place over the same secure communication channel, but as separate communication steps. The communication channel over which the challenge code 132 is provided to the user 102 may be deemed to be a trusted channel. For example, the user 102 may interact directly with the application server 104 over a secure network connection, which is presumably accessed over the organization's intranet, for example, to display the challenge code 132 on a graphical user interface or web page before the communication 136 is delivered. The user 102 may receive the challenge code 132 from a colleague (e.g., a department manager may distribute the challenge code to a group of users), and so on. The communication 136, on the other hand, is provided to the user 102 separately, for example, by emailing the communication in an attachment, or by attaching it as parameter to an HTTP redirect response URL and sending the HTTP redirect response as the last step of the configuration request dialog after the challenge code 132 was displayed to the user 102. By using different communication channels to provide the challenge code 132 separately from how the communication 136 is delivered, an additional level of security is provided since it may be difficult to attack or otherwise hack each communication channel. For example, the challenge code can also be communicated to the user by sending a short message service (SMS) text to the mobile computing device 106.

Figure 5:
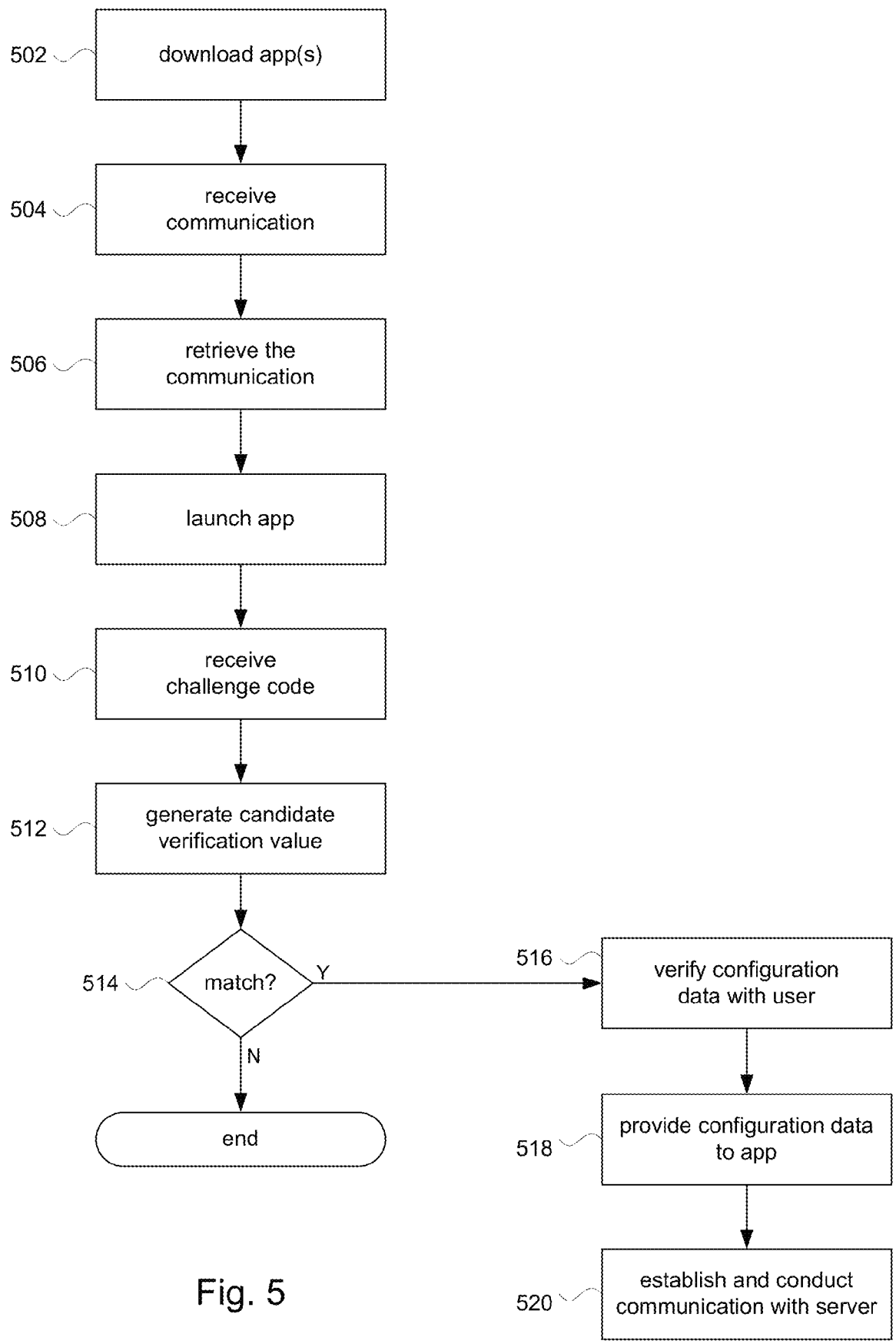
FIG. 5 illustrates an example of processing that may be performed by the mobile computing device.

Referring to FIG. 5, configuration processing in the mobile computing device 106 in accordance with principles of the present disclosure is explained. In a step 502, at some time, the user 102 may download the app(s) 122 for which configuration processing is needed. The app 122 may be purchased before the user 102 logs onto the application server 104 to initiate configuration processing, or after the user has logged onto the application server. In the "large group" scenario, the application server 104 may generate the challenge code 132 and send out a communication 136 (step 412) before they even know about the app 122.

In a step 504, the user 102 may receive the communication 136 sent by the application server 104 (step 412). For example, if the communication 136 is an email, the user 102 may be notified that an email has arrived in their mailbox. In some embodiments, if the communication 136 is not by email but by means of an HTTP redirect response, the app 122 to be configured or the configuration app 124 may be launched via the redirect URL (also referred to as URL forwarding) pointing to the custom URL scheme of the app to be launched.

In a step 506, the user 102 may retrieve the communication 136 using their mobile computing device. For example, the user 102 may open an email and open an attachment which contains the communication 136. In a step 508, an app that is associated with the attachment may be launched when the user 102 opens the attachment. For example, when an attachment has a file type "PDF", a PDF reader application that is associated with file type PDF can be launched in order to read the attachment. Likewise, the communication 136 has a file type. In some embodiments, the communication 136 may be associated with the app 122 ("target app") that is to be configured, in which case the target app is launched when the user 102 opens the attachment. In another embodiment, the communication 136 may be associated with a configuration app 124 (FIG. 1A), in which case the configuration app is launched. In some embodiments, where the communication 136 is not by email but by means of an HTTP redirect response, the app 122 to be configured or the configuration app 124 directly may retrieve the communication 136 as part of the HTTP redirect URL used for launching.

In a step 510, the app (whether the target app 122 or the configuration app 124) reads in the data comprising the communication 136. The app may display an input box (e.g., 314, FIG. 3) on the mobile computing device 106 allowing the user 102 to enter the challenge code 132 provided to the user in step 408 (user-provided challenge code 132').

In a step 512, the app (whether the target app or the configuration app) generates a candidate verification value using the configuration data 134 received in the communication 136 and the challenge code 132' received in step 510. In a step 514, if the candidate verification value matches the verification value 134*a* provided in the communication 136, then the configuration data 134 is deemed to be verified, and processing may proceed to a step 516.

In step 516, the app (whether the target app or the configuration app) may display the configuration data 134 received in the communication 136 to the user 102 on the mobile computing device 106. The user 102 may be prompted to accept or deny the configuration data. This step may be performed as an added measure of security, giving the user 102 the final word whether or not to proceed with using the configuration data 134 to configure the target app 122.

In a step 518, the now verified communication data 134 may be provided to the target app 122. In an embodiment where the steps 510-516 are performed by the target app 122, then the target app simply configures itself with the configuration data 134.

In an embodiment where the steps 510-516 are performed by the configuration app 124, then the configuration app may provide the configuration data 134 to the target app 122. The specific details on how the configuration data 134 is provided to the target app 122 depends on the services provided by the operating system (OS) of the mobile computing device 106, and the conventions adopted for providing configuration data to an app. For example, each app may designate a directory or a file in the file system for storing its configuration data. The configuration app 124 may store the configuration data 134 in those files. The OS may provide interprocess communication services, allowing the configuration app 124 to send the configuration data 134 to the target app 122 using the OS's interprocess communication services, such as custom URL schemes, intents, sockets, memory pipes or the like.

In a step 520, the target app 122 is now properly configured for communication with the backend servers 142 of the organization. The configuration data 134 may include configuring the target app 122 for secured transmission and reception of data, enabling or disabling certain functionality depending who the user is, and so on.

Figure 6:
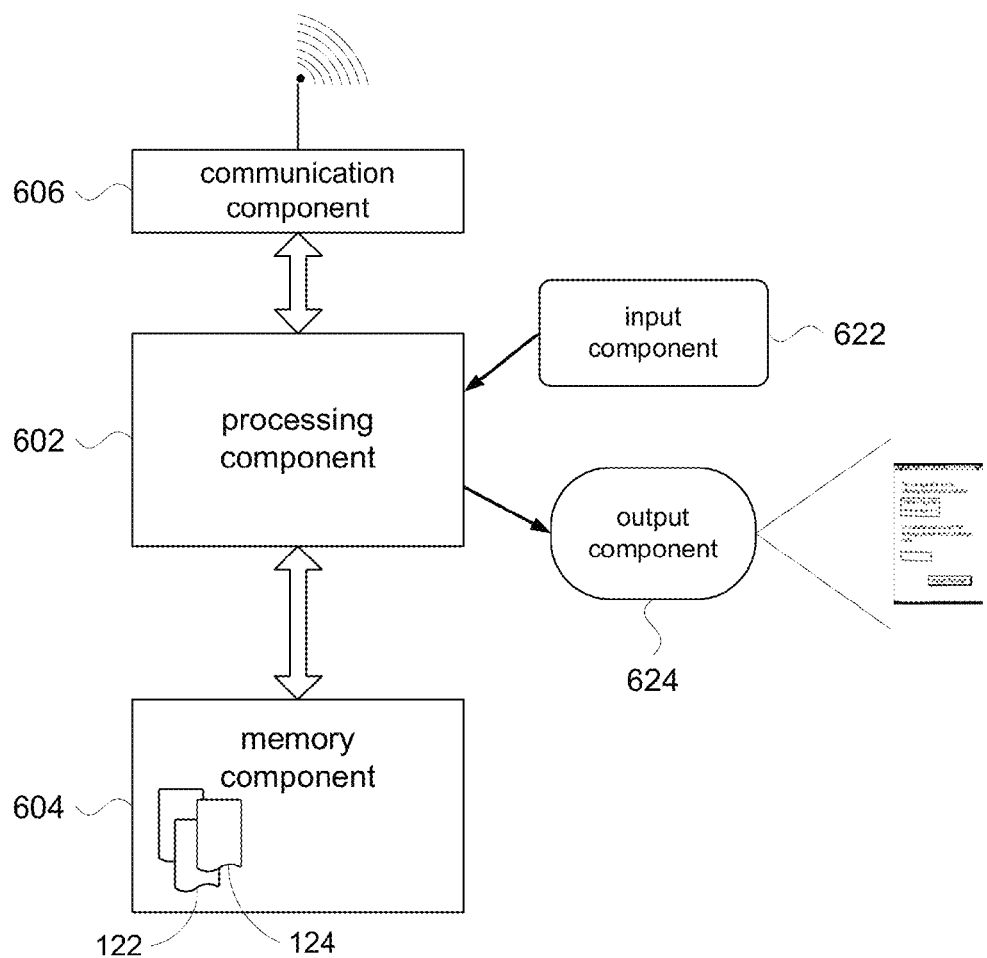
FIG. 6 shows a system block diagram of a mobile computing device in accordance with the present disclosure.

A particular embodiment of a mobile computing device 106 in accordance with the present disclosure is illustrated by the block diagram in FIG. 6. The mobile computing device 106 may comprise a processing component 602 such as a microcontroller. A memory component 604 may comprise static memory (e.g., flash random access memory, RAM) and/or dynamic memory (dynamic random access memory, DRAM). The memory component 604 may store data and apps that can be executed by the mobile computing device 106. For example, the memory component 604 may store app 122, and in some embodiments may store configuration app 124. The apps may cause the processing component 602 to performs steps such as set forth in FIG. 5. A communication component 606 may provide a suitable wireless communication channel to the organization's backend servers 142. The communication component 606 may support several wireless communication formats, including for example, Bluetooth, 3G, and so on.

The mobile computing device 106 may include an input component 622 and an output component 624. In some embodiments, the input component 622 and the output component 624 may be integrated in one component such as a touch-sensitive display. In other embodiments, they may be separate. In accordance with the present disclosure, the processing component 602 may present certain displays on the output component 624. For example, when the processing component 602 executes app 122 or configuration app 124, the output component 624 may present the display illustrated in FIG. 3.

Figure 7:
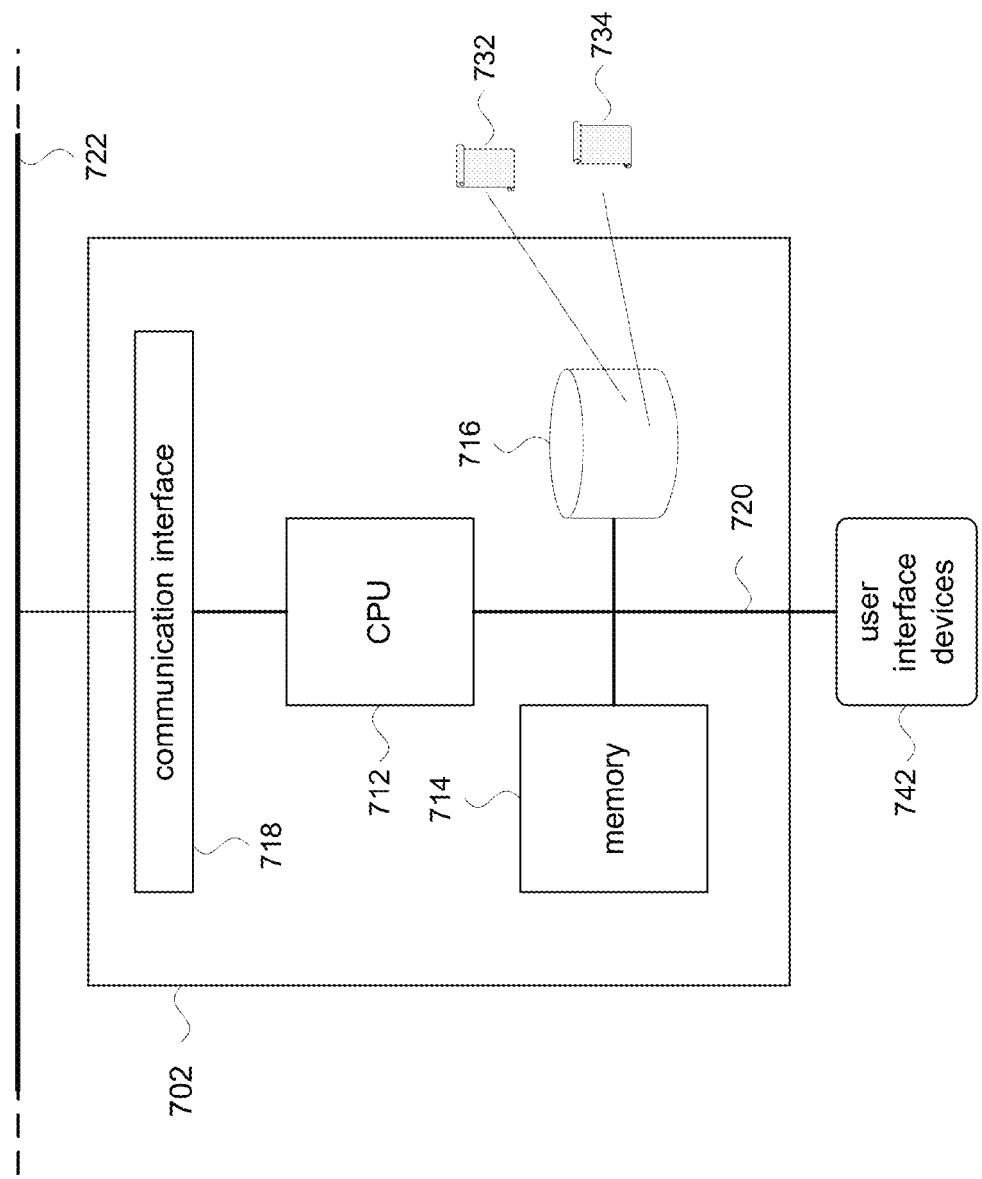
FIG. 7 shows a system block diagram of an application server in accordance with the present disclosure.

A particular embodiment of the application server 104 in accordance with the present disclosure is illustrated by the block diagram of FIG. 7, showing a high level block diagram of a computer system 702 configured to operate in accordance with the present disclosure. The computer system 702 may include a central processing unit (CPU) or other similar data processing component. The computer system 702 may include various memory components. For example, the memory components may include a volatile memory 714 (e.g., random access memory, RAM) and a data storage device 716. A communication interface 718 may be provided to allow the computer system 702 to communicate over a communication network 722, such as a local area network (LAN), the Internet, and so on. An internal bus 720 may interconnect the components comprising the computer system 702.

The data storage device 716 may comprise a non-transitory computer readable medium having stored thereon computer executable program code 732. The computer executable program code 732 may be executed by the CPU 712 to cause the CPU to perform steps of the present disclosure, for example the steps set forth in FIG. 4. The data storage device 716 may store data structures 734 such as object instance data, runtime objects, and any other data described herein. In some embodiments, the data storage device 716 may store the configuration data 134 and the verification value 134a that is to be sent to the mobile computing device.

A user (e.g., user 102) may interact with the computer system 702 using suitable user interface devices 742. They may include, for example, input devices such as a keyboard, a keypad, a mouse or other pointing device, and output devices such as a display.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Figure 8:
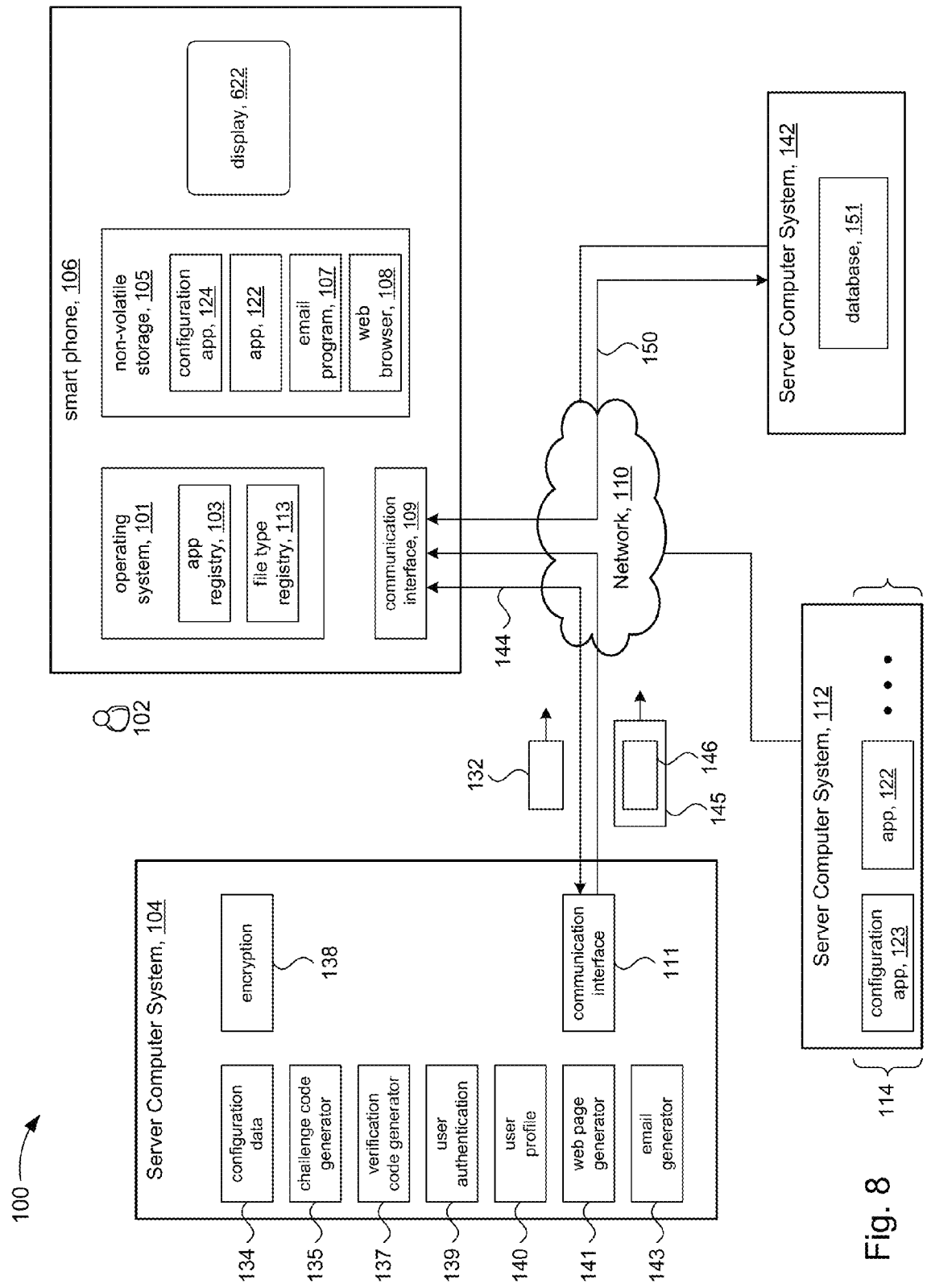
FIG. 8 shows a block diagram in accordance with an embodiment of the present disclosure.

The configuration in FIG. 8 shows additional details of data processing system 100 introduced in FIG. 1, including details of a mobile computing device 106, such as a smartphone. The mobile computing device 106 may include a user interface, such as a touch sensitive display 622 that serves both for input and output. The mobile computing device 106 may include an operating system 101 that implements a registry for the application programs that are installed on the mobile computing device 106. For example, each installed application may be registered in the registry by means of a custom URL scheme that identifies a given app on the mobile computing device 106. In addition, the operating system 101 may implement a file type registry 113 where the file types that can be processed by a given app are registered. For example, clicking on a file that is stored on the mobile computing device 106 and that has a file type which is registered for a given app may automatically start that app. Depending on the implementation, one or more file types may be registered for the configuration app 124, or—especially in the absence of a configuration app—for the target app 122 to be configured.

The mobile computing device 106 may include a non-volatile storage 105 for storing apps, for example, app 122. Suppose the app 122 is the target app to be configured. An additional configuration app 124 may also be stored in the non-volatile storage 105. The configuration app 124 may implement a configuration program module for configuring the app 122. Alternatively, a configuration program module may constitute an integral part of the app 122 such that a separate configuration app 124 is not required. The non-volatile storage 105 may further include an email program 107 for receiving email messages with attachments and a web browser 108.

The mobile computing device 106 may include a communication interface 109 for coupling the mobile computing device 106 to a network 110, such as the Internet and/or a company's intranet. The communication interface 109 may be an interface to a digital cellular mobile telecommunications network that enables the establishment of connections using the TCP/IP protocol, such as the establishment of an internet session using HTTP or HTTPS and the transmission of email messages. On another communication layer, e.g., the so-called signaling layer in the case of GSM, the communication interface 109 may enable the reception of SMS messages.

The server computer system 104 may include a respective communication interface 111 for coupling to the communication interface 109 via the network 110. The server computer system 104 may store the configuration data 134 and use a challenge code generator 135 to generate the challenge code 132. In some embodiments, the challenge code generator 135 may be implemented as a pseudo random or true random number generator. The server computer system 104 may include a verification value generator 137 that can be implemented by a program module that is executable to generate the verification value 134a (cf. FIG. 1 and FIG. 1A).

The server computer system 104 may include an encryption module 138 for encryption of the configuration data 134. The encryption may be performed using the challenge code 132 using any suitable algorithm including symmetric encryption, by asymmetric encryption, etc.

The server computer system 104 may include a user authentication component 139 for authentication of users, such as user 102. For example, user authentication may be performed by means of a user ID/password combination, biometric authentication and/or other authentication means.

The server computer system 104 may include a database component 140 for storing a user profile for each registered user, such as for user 102. The user profile of a given user may contain a communication address for electronic communication with that user, such as an email address for sending an email to the mobile computing device 106 and/or a telephone number for sending an SMS message to the mobile computing device 106, and so on.

The server computer system 104 may include a web page generator 141, for generating web pages, such as screens #1 and #2 as shown in FIG. 2, and an email generator 143. The email generator 143 may be a program module that generates an email to be sent to the email address of the user that requests the configuration in an email attachment that contains the configuration data 134 and the verification value 134a. Instead of an email generator 143, an SMS generator may be utilized to send the configuration data 134 and the verification value 134a to the user 102. In the latter case, this may be done by sending a binary SMS that contains the configuration data 134 and the verification value 134a. Alternatively, the challenge code 132 can be sent by SMS, not the configuration data 134 and the verification value 134a.

In operation, the user 102 may start the web browser 108 and enter the URL of the app store server 112 that is implemented by a server computer system. The user may select the app 122 and the corresponding configuration app 124 for downloading and installation on the mobile computing device 106. Installation can be performed by registering the app 122 and the configuration app 124 in the app registry 103 using the custom URL scheme of the app 122 and the custom URL scheme of the configuration app 124. For the configuration app 124, a predefined file type may be registered in the file type registry 113.

Next, the user 102 may enter the URL of the application server 104 into web browser 108 such that a secure network connection 144 is established via the network 110 such as by means of the https protocol. Alternatively, the secure network connection 144 can be established via an intranet rather than via the network 110 or via a virtual private network to provide security for the secure network connection 144.

The user 102 may need to authenticate against the application server 104 that is implemented by a server computer system, such as by entering his or her username and password combination into the user authentication component 139 via the connection 144. After successful user authentication, the webpage generator 141 may generate a webpage for the user's entry of his or her request for configuring the app 122 analogous to screen #1 as shown in FIG. 2. By clicking the 'request configuration' button 206, the user 102 may request configuration of the app 122. In response the challenge code generator 135 may generate the challenge code 132. The challenge code 132 may then be transmitted from the application server 104 via the connection 144 to the mobile computing device 106 and displayed by means of the web browser 108 on the display 622.

In addition, the email generator 143 may read the configuration data 134 and trigger the verification value generator 137 to generate a verification value 134a such as by concatenating the configuration data 134 and the challenge code 132, and calculating a message authentication code on the concatenation such as by calculating a hash value for the concatenation using a predefined hashing algorithm. The email generator 143 may generate an email to the email address of the user 102 that is stored in that user's user profile in database component 140 and an email attachment 146 that contains a file comprising the configuration data 134 and the verification value 134a.

In some embodiments, the configuration data 134 may be encrypted by the encryption module 138, such as by symmetric encryption using the challenge code 132 as a symmetric key or as a starter or seed value for calculating a symmetric key. In this instance, the email attachment contains only the encrypted configuration data 134 for providing additional security; for example, the symmetric key which is securely derived from the challenge code 132, e.g. according to the PKCS#5 standard. Depending on the implementation, the configuration data 134 can be encrypted using the symmetric key and sent to the user without a verification value, as the verification of the configuration data 134 is performed by decrypting the received configuration data 134 using the challenge code. In other embodiments, both the configuration data 134 and the verification value 134a are encrypted by means of the symmetric key to provide an additional layer of security.

The resultant email 145 with the email attachment 146 can then be sent from the application server 104 to the email program 107 of the mobile computing device 106.

The attachment 146 of the email 145 has the predefined file type that is registered in the file type registry 113 for the app 122 to be configured or for configuration app 124. When the user 102 clicks on the attachment 146, that action can invoke the app 122 to be configured or configuration app 124. The app 122 to be configured or configuration app 124 may prompt the user 102 to enter the challenge code 132 that had previously been displayed on the touch sensitive display 622 (user-provided challenge code 132').

In some embodiments, the configuration app 124 may use the user-provided challenge code 132' to generate a candidate verification value (cf. steps 510, 512 in FIG. 5), for example, using the same algorithm as the application server 104 by concatenating the configuration data contained in the attachment 146 with the user-provided challenge code 132' and calculating the message authentication code. If the message authentication code calculated by the mobile computing device 106 matches the verification value 134a contained in the communication (e.g., attachment 146 in email 145), then verification is deemed successful.

If the configuration data 134 has been encrypted by means of the encryption module 138 using the challenge code 132, the configuration app 124 can use the user-provided challenge code 132' entered by the user for symmetric decryption of the configuration data 134 before the decrypted configuration data 134 is concatenated with the challenge code 132'. This can provide an additional level of security as interception of the email 145 is worthless for an attacker since the email 145 does not contain the challenge code 132 that would be required for decrypting of the configuration data 134.

Upon successful verification, the configuration app 124 may invoke the app 122 by means of the custom URL scheme of the app 122 and provides the configuration data 134 to the app 122 such that configuration is complete.

When the user clicks on app 122 after configuration is complete, the app 122 may use the URL contained in the configuration data 134 to establish an Internet session 150 with one of the backend servers 142, such as for establishing a database session with database 151. This may require prior authorization of the user 102 against the backend server 142. As an alternative, an app group mechanism may be utilized for grouping the configuration app 124 and the app 122 in order to communicate the configuration data 134 such as by putting the configuration data 134 into a known file location to which only the group of apps has access.

As a further alternative, the configuration program module that is implemented by the configuration app 124 me be incorporated within the app 122 itself such that an additional configuration app is not required. In this instance the app 122 itself is invoked when the user clicks on the email attachment 146.

Figure 9:
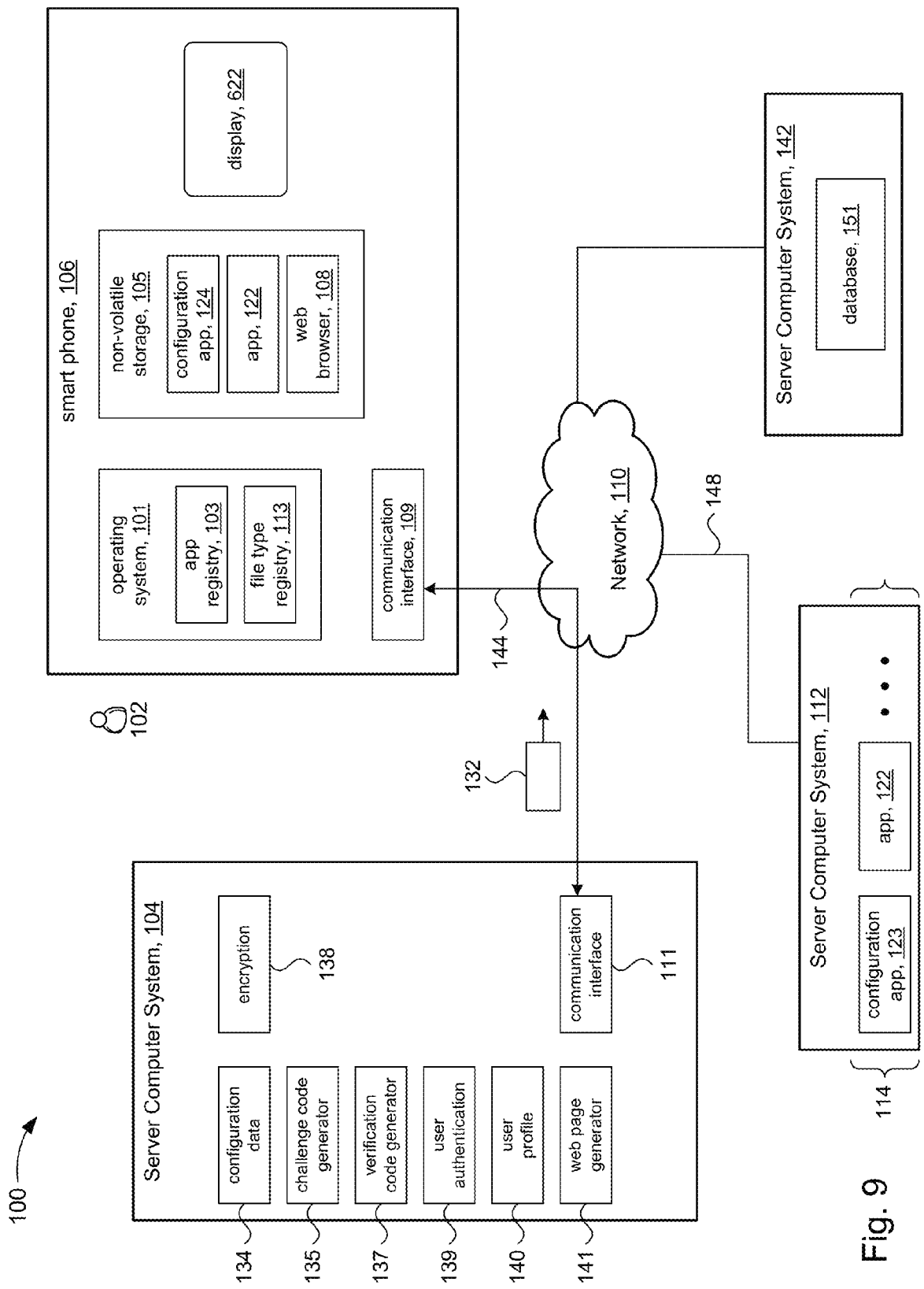
FIG. 9 shows a block diagram of a further embodiment in accordance with the present disclosure.

FIG. 9 shows an alternative to the configuration in FIG. 8. In contrast to the embodiment of FIG. 8, the configuration data 134 and the verification value 134*a* are not communicated by means of an email, but instead by a re-direct response. The user authentication and the transmission of the challenge code 132 via the secure network connection 144 may be performed as in the embodiment of FIG. 8. Next, the user 102 may request the configuration data 134 from the application server 104 via the secure network connection 144. In response, the webpage generator 141 may generate a re-direct for the web browser 108 that contains the custom URL scheme of the configuration app 124, the configuration data 134, and the verification value 134*a*.

In response to the re-direct received from the application server 104, the web browser 108 may invoke the configuration app 124 using the custom URL scheme of that configuration app 124 and communicate the configuration data 134 and the verification value 134*a* to the configuration app 124 to start the verification and configuration process on the mobile computing device 106. Alternatively, if the app 122 comprises the configuration program module, the custom URL scheme contained in the re-direct is the custom URL scheme of the app 122.

It is to be noted that the challenge code 132 may be transmitted via a communication channel that is constituted by the network connection 144, the touch sensitive display 622 and the user 102, as the challenge code is displayed on the touch sensitive display and then entered by the user 102 at a later point of time or retrieved from the cut and paste buffer by the user. In contrast, transmission of the configuration data and the verification value, if any, involves only the network connection. As a consequence, the transmission of the challenge code 132 and the transmission of the configuration data/verification value is performed via two different communication channels in this embodiment.

As a further alternative the re-direct response may contain a MIME-type attachment that is analogous to the email attachment 146.

ADVANTAGES AND TECHNICAL EFFECT

The present disclosure facilitates provisioning and consumption of required initial configuration data for mobile apps in a way which is simple and easy to use, an important consideration for non-technical users. At the same time, it provides means to verify the authenticity and integrity of this initial configuration data by means of a secret (namely, the challenge code) known only to an authorized user (or authorized group of users), thereby considerably reducing the risk of misuse. An easy-to-use and secure onboarding and initial configuration of mobile apps significantly increases adoption and usage of mobile apps generating business value.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method of configuring an application program of a mobile computing device, the method comprising:
   establishing a secure network connection between the mobile computing device and a server computer system;
   authenticating a user of the mobile computing device against the server computer system via the secure network connection;
   receiving, at the server computer system, a configuration request via the secure network connection from the mobile computing device, the configuration request indicative of a user's request for configuring the application program; and
   in response to receiving the configuration request:
     generating a challenge code;
     sending the challenge code via the secure network connection to the mobile computing device;
     encrypting configuration data using a symmetric key, wherein the symmetric key is the challenge code or the symmetric key is derived from the challenge code;
     sending the configuration data in encrypted form via the secured network connection to the mobile computing device; and
     sending a verification value from the server computer system to the mobile computing device either via an additional communication channel that is different from the secure network connection or as a separate communication over the same secure network connection, wherein the verification value is a hash-based message authentication code (HMAC) produced by applying a secure hash function to a combination of the configuration data with the challenge code,
   whereby the mobile computing device, in response to receiving the configuration data and the verification value, invokes a configuration program module to:
     prompt the user to enter a challenge code via a user interface;
     decrypt the configuration data in encrypted form upon entry of the challenge code via an input component of the mobile computing device;
     verify the configuration data using the challenge code entered by the user and the verification value received via the additional communication channel; and
     configure the application program using the configuration data in response to verification of the configuration data.

2. The computer-implemented method of claim 1, wherein the configuration data comprises at least a uniform resource locater (URL) of an additional server computer system, the method further comprising, subsequent to configuration of the application program, steps of:
- establishing an additional secure network connection between the configured application program on the mobile computing device and the additional server computer system using the URL contained in the configuration data;
- authenticating the user of the mobile computing device against the additional server computer system; and
- processing requests exchanged over the authenticated secure network connection between the configured application program on the mobile computing device and the additional server computer system.

3. The computer-implemented method of claim 2, wherein the configuration data further comprises a port number of the additional server computer system, wherein establishing an additional secure network connection uses the port number.

4. The computer-implemented method of claim 1, wherein the server computer system comprises a user registration database for storing user registration information, the user registration information comprising reference data for authenticating the user against the server computer system and an address for establishing an additional communication channel for sending the configuration data and the verification value to the mobile computing device, wherein in response to the configuration request and subsequent to a successful authentication of the user against the server computer system, the server computer system retrieves the address from the user registration database and sends the configuration data and verification value to the address via the additional communication channel.

5. The computer-implemented method of claim 4, wherein either the address is an email address and the configuration data and the verification value are sent from the server computer system to the mobile computing device as an email message or the address is a telephone number of the mobile computing device and the configuration data and the verification value are sent from the server computer system to the mobile computing device as one or more SMS messages.

6. The computer-implemented method of claim 1, wherein sending the challenge code via the secure network connection to the mobile computing device comprises sending one or more SMS messages.

7. The computer-implemented method of claim 1 further comprising, in response to the configuration request and subsequent to a successful authentication of the user against the server computer system over a secure network connection:
- retrieving the configuration data and the verification value; and
- sending a response to the configuration request via the same secure network connection to a browser program of the mobile computing device, the response comprising the configuration data, the verification value, and a redirect to a custom URL scheme that references the configuration program module,
- whereby the browser program executes the redirect to invoke the configuration program module.

8. The computer-implemented method of claim 1, wherein the mobile computing device:
- receives a first communication that includes the configuration data for the application program and the verification value, the verification value generated from a combination of the configuration data and the challenge code;
- receives the challenge code from the user of the mobile computing device;
- verifies authenticity of the configuration data using the challenge code from the user including generating a candidate verification value from a combination of the configuration data and the challenge code from the user, wherein the configuration data is deemed verified when the verification value received in the first communication matches the candidate verification value generated; and
- provides the configuration data to the application program in response to the configuration data being deemed verified.

9. The computer-implemented method of claim 8, wherein the application program is a first application program, wherein a second application program in the mobile computing device, different from the first application program, performs the steps of receiving a challenge code and verifying authenticity of the configuration data,
- wherein providing the configuration data to the first application program includes the second application program communicating with the first application program,
- wherein providing the configuration data to the first application program includes the second application program storing the configuration data in a data file that can be accessed by the first application program,
- wherein the first application program uses the configuration data to establish and conduct communications with a server in response to the configuration data being deemed verified by the second application program.

10. The computer-implemented method of claim 1, wherein the server computer system sends the configuration data and the verification value as an attachment in an email message.

11. The computer-implemented method of claim 1, wherein the configuration data is used by a mobile application executing on the mobile computing device to establish and conduct communications with a server.

12. A server computer system comprising:
- a computer processor;
- a memory; and
- a data store having stored therein computer executable program code, which when executed by the computer processor, causes the computer processor to:
- establish a secure network connection between a mobile computing device and the server computer system;
- authenticate a user of the mobile computing device against the server computer system via the secure network connection;
- receive, at the server computer system, a configuration request via the secure network connection from the mobile computing device, the configuration request indicative of a user's request for configuring the application program; and
- in response to receiving the configuration request:
  - generate a challenge code by the server computer system;
  - send the challenge code via the secure network connection to the mobile computing device;
  - encrypt configuration data using a symmetric key, wherein the symmetric key is the challenge code or the symmetric key is derived from the challenge code;
  - send the configuration data in encrypted form via the secured network connection to the mobile computing device; and
  - send a verification value to the mobile computing device via an additional communication channel that is different from the secure network connection, or as a separate communication over the same secure network connection, wherein the verification value is a hash-based message authentication code (HMAC) produced by applying a secure hash function to a combination of the configuration data with the challenge code, whereby the mobile computing device, in response to receiving the configuration data and the verification value, invokes a configuration program module to:
prompt the user to enter a challenge code via a user interface;
decrypt the configuration data in encrypted form upon entry of the challenge code via an input component of the mobile computing device;
verify the configuration data using the challenge code entered by the user and the verification value received via the additional communication channel; and
configure the application program using the configuration data in response to verification of the configuration data.

13. The server computer system of claim 12, wherein the configuration data comprises at least a uniform resource locater (URL) of an additional server computer system, wherein the computer executable program code, which when executed by the computer processor, further causes the computer processor to perform actions subsequent to configuration of the application program, the actions including:
establishing an additional secure network connection between the mobile computing device and the additional server computer system using the URL contained in the configuration data;
authenticating the user of the mobile computing device against the additional server computer system; and
processing requests exchanged over the authenticated secure network connection between the configured application program on the mobile computing device and the additional server computer system.

14. The server computer system of claim 12 further comprising a user registration database for storing user registration information, the user registration information comprising reference data for authenticating the user against the server computer system and an address for establishing an additional communication channel for sending the configuration data and the verification value to the mobile computing device, wherein in response to the configuration request and subsequent to a successful authentication of the user against the server computer system, the server computer system retrieves the address from the user registration database and sends the configuration data and verification value to the address via the additional communication channel.

15. The server computer system of claim 12, wherein the computer executable program code, which when executed by the computer processor, further causes the computer processor to perform actions in response to the configuration request and subsequent to a successful authentication of the user over a secure network connection, the actions including:
retrieving the configuration data and the verification value; and
sending a response to the configuration request via the same secure network connection to a browser program of the mobile computing device, the response comprising the configuration data, the verification value, and a redirect to a custom URL scheme that references the configuration program module,
whereby the browser program executes the redirect to invoke the configuration program module.

16. A non-transitory computer readable storage medium having stored thereon computer executable code, which when executed by a computer causes the computer to:
establish a secure network connection between a mobile computing device and a server computer system;
authenticate a user of the mobile computing device against the server computer system via the secure network connection;
receive, at the server computer system, a configuration request via the secure network connection from the mobile computing device, the configuration request indicative of a user's request for configuring the application program; and
in response to receiving the configuration request:
generate a challenge code by the server computer system;
send the challenge code via the secure network connection to the mobile computing device;
encrypting configuration data using a symmetric key, wherein the symmetric key is the challenge code or the symmetric key is derived from the challenge code;
sending the configuration data in encrypted form via the secured network connection to the mobile computing device; and
send a verification value to the mobile computing device via an additional communication channel that is different from the secure network connection, or as a separate communication over the same secure network connection, wherein the verification value is a hash-based message authentication code (HMAC) produced by applying a secure hash function to a combination of the configuration data with the challenge code,
whereby the mobile computing device, in response to receiving the configuration data and the verification value, invokes a configuration program module to:
prompt the user to enter a challenge code via a user interface;
decrypt the configuration data in encrypted form upon entry of the challenge code via an input component of the mobile computing device;
verify the configuration data using the challenge code entered by the user and the verification value received via the additional communication channel; and
configure the application program using the configuration data in response to verification of the configuration data.

17. The non-transitory computer readable storage medium of claim 16, wherein the configuration data comprises at least a uniform resource locater (URL) of an additional server computer system, the non-transitory computer readable storage medium further having stored thereon computer executable code, which when executed by a computer causes the computer to perform actions subsequent to configuration of the application program including:
establishing an additional secure network connection between configured the application program on the mobile computing device and the additional server computer system using the URL contained in the configuration data;
authenticating the user of the mobile computing device against the additional server computer system; and
processing requests exchanged over the authenticated secure network connection between the configured application program on the mobile computing device and the additional server computer system.

18. The non-transitory computer readable storage medium of claim 16 further having stored thereon computer executable code, which when executed by a computer causes the computer to perform actions in response to the configuration request and subsequent to a successful authentication of the user over a secure network connection, the actions including:
 retrieving the configuration data and the verification value; and
 sending a response to the configuration request via the same additional secure network connection to a browser program of the mobile computing device, the response comprising the configuration data, the verification value, and a redirect to a custom URL scheme that references the configuration program module,
 whereby the browser program executes the redirect to invoke the configuration program module.

\* \* \* \* \*